United States Patent [19]

Ejiri et al.

[11] Patent Number: 4,801,505
[45] Date of Patent: Jan. 31, 1989

[54] MAGNETIC RECORDING MEDIUM

[75] Inventors: Kiyomi Ejiri; Hiroaki Araki; Akihiro Matsufuji; Akira Kasuga, all of Kanagawa, Japan

[73] Assignee: Fuji Photo Film Co., Ltd., Kanagawa, Japan

[21] Appl. No.: 110,294

[22] Filed: Oct. 20, 1987

[30] Foreign Application Priority Data

Oct. 20, 1986 [JP] Japan ................. 61-248856
Oct. 20, 1986 [JP] Japan ................. 61-248857

[51] Int. Cl.$^4$ .................. G11B 5/712; G11B 5/702
[52] U.S. Cl. .................. 428/404; 252/62.54; 427/128; 427/131; 428/403; 428/328; 428/329; 428/522; 428/425.9; 428/694; 428/695; 428/900; 428/323; 428/698; 428/704
[58] Field of Search ............. 428/403, 404, 328, 329, 428/694, 695, 900, 522, 425.9, 323, 698, 408, 704; 252/62.54, 62.58; 360/134–136; 427/128, 131

[56] References Cited

U.S. PATENT DOCUMENTS

| | | | |
|---|---|---|---|
| 3,814,598 | 6/1974 | Gabriel | 428/928 |
| 4,020,236 | 4/1977 | Aonuma | 427/127 |
| 4,246,316 | 1/1981 | Aonuma | 427/404 |
| 4,390,361 | 6/1983 | Sueyoshi | 428/403 |
| 4,407,901 | 10/1983 | Miyatsuka | 427/127 |
| 4,439,486 | 3/1984 | Yamada | 427/128 |
| 4,537,833 | 8/1985 | Kasuga | 428/328 |
| 4,555,431 | 11/1985 | Miyatsuka | 428/323 |
| 4,613,545 | 9/1986 | Chubachi | 428/328 |
| 4,690,863 | 9/1987 | Miyoshi | 427/128 |

Primary Examiner—Ellis P. Robinson
Attorney, Agent, or Firm—Sughrue, Mion, Zinn, Macpeak & Seas

[57] ABSTRACT

A magnetic recording medium contains in its magnetic recording layer a ferromagnetic metal powder containing an aluminum component in an amount of 1 to 6% by weight as alumnum metal, and an extremely hard abrasive such as α-alumina, chrome oxide, silicon carbide and silicon nitride. A magnetic recording medium preferably contains in its magnetic recording layer a binder comprising a resin component having a polar group.

6 Claims, 2 Drawing Sheets

MAGNETIC RECORDING MEDIUM

BACKGROUND OF THE INVENTION

1. Field of the Invention

The present invention relates to a magnetic recording medium comprising a nonmagnetic support and a magnetic recording layer provided on the support.

2. Description of Prior Art

A magnetic recording medium is widely used as an audio tape, a video tape, a floppy disc, etc. The magnetic recording medium basically comprises a nonmagnetic support and a magnetic recording layer provided on the support, and the magnetic recording layer comprises a binder and a ferromagnetic powder dispersed therein.

A magnetic recording medium is required to be satisfactory in various properties such as electromagnetic conversion characteristics, running endurance and running property. Recently, an 8 mm type video tape recorder or the like has been broadly employed, and hence it is particularly required for a video tape to have high electromagnetic conversion characteristics such as high reproducibility of an original image.

For improving the electromagnetic conversion characteristics of the magnetic recording medium, a ferromagnetic metal powder having high electromagnetic properties (e.g., coercive force) has been utilized in recent days. The ferromagnetic metal powder comprises a ferromagnetic metal such as cobalt and nickel or their alloys, and employment of such ferromagnetic metal powder makes it possible to prepare a magnetic recording medium having high electromagnetic conversion characteristics.

It is generally thought that the electromagnetic conversion characteristics of the recording medium can be enhanced by using more minimized ferromagnetic powder.

However, the above-mentioned ferromagnetic metal powder has a lower hardness than a γ-iron oxide type ferromagnetic powder or a modified γ-iron oxide type ferromagnetic powder containing cobalt, etc., and therefore a magnetic recording layer of a magnetic recording medium prepared in a conventional manner tends to lower in its mechanical or physical strength as compared with a magnetic recording layer prepared by using the γ-iron oxide type ferromagnetic powder or the modified γ-iron oxide type ferromagnetic powder. Hence, the magnetic recording layer of the recording medium using the ferromagnetic metal powder easily suffers from damages caused by contact with a magnetic head, etc. in the course of running procedure. Thus damaged magnetic recording layer is poor in electromagnetic conversion characteristics, and an expected favorable effect cannot be obtained even by using such ferromagnetic metal powder.

For solving the above-mentioned problem occurring in the case of using the ferromagnetic metal powder, an abrasive is generally incorporated into the magnetic recording layer in a large amount so as to form an area of high hardness in the recording layer, whereby the recording layer is prevented from damages caused by contact between the recording layer and a member of running system such as a magnetic head. That is, as the content of the abrasive increases, the area of high hardness naturally increases in the magnetic recording layer, and thereby the recording layer is hardly damaged.

However, in the case of using a large amount of the abrasive for obtaining favorable mechanical strength in the magnetic recording medium using the ferromagnetic metal powder, the amount of the ferromagnetic metal powder should be reduced. As a results, there arises a problem that the obtained magnetic recording medium hardly shows satisfactory electromagnetic conversion characteristics even if the ferromagnetic metal powder is employed.

The improvement of the electromagnetic conversion characteristics mainly depends on an improvement of the ferromagnetic metal powder (nature, amount, etc.), and the abrasive does not directly contribute to the improvement. Therefore, as for a magnetic recording medium requiring particularly high electromagnetic conversion characteristics such as an 8 mm type video tape, decrease of the amount of the ferromagnetic metal powder accompanied by incorporation of a large amount of the abrasive gives a serious problem.

A method of using a small amount of aluminum in the preparation of a ferromagnetic metal powder for preventing sintering of particles of the ferromagnetic metal powder caused by a reduction reaction by heating is also known as described in Japanese Patent Publication No. 59(1984)-19163, but a function of the ferromagnetic metal powder in the magnetic recording layer obtained by this method has not been clarified so far.

SUMMARY OF THE INVENTION

It is an object of the present invention to provide a magnetic recording medium which is improved in both of running properties (i.e., running endurance) and electromagnetic conversion characteristics.

More particularly, the object of the invention is to provide a magnetic recording medium sufficiently showing excellent electromagnetic properties of the employed ferromagnetic metal powder, as well as the highly improved running endurance.

There is provided by the present invention a magnetic recording medium comprising a nonmagnetic support and a magnetic recording layer provided on the support, said magnetic recording layer comprising a ferromagnetic metal powder and an abrasive both dispersed in a binder, which is characterized in that:

said ferromagnetic metal powder contains an aluminum component in an amount of 1 to 6% by weight as aluminum metal;

and said abrasive in the magnetic recording layer comprises a material selected from the group consisting of α-alumina, chrome oxide, silicon carbide and silicon nitride.

There is further provided by the invention a magnetic recording medium comprising a nonmagnetic support and a magnetic recording layer provided on the support, said magnetic recording layer comprising a ferromagnetic metal powder and an abrasive both dispersed in a binder, which is characterized in that:

said ferromagnetic metal powder contains an aluminum component in an amount of 1 to 6% by weight as aluminum metal;

and said binder in the magnetic recording layer comprises a resin component having a polar group.

It hs been confirmed by the studies of the present inventors that the ferromagnetic metal powder containing an aluminum component in the specific amount has very high hardness without lowering its electromagnetic properties as compared with the conventional ferromagnetic metal powder not containing an aluminum component.

By using the above-mentioned ferromagnetic metal powder enhanced in hardness in combination with an abrasive having particularly high hardness, the amount of the abrasive can be reduced in the magnetic recording layer, whereby the amount of the ferromagnetic metal powder can be increased. Accordingly, the magnetic recording medium such as a magnetic tape prepared as above shows high running endurance and satisfactory electromagnetic conversion characteristics.

Further, by dispersing the above-mentioned ferromagnetic metal powder and abrasive in a binder containing a resin component having a polar group, the resulting magnetic recording layer is highly improved in both of the running endurance and the electromagnetic conversion characteristics.

DETAILED DESCRIPTION OF THE INVENTION

Figure 1:
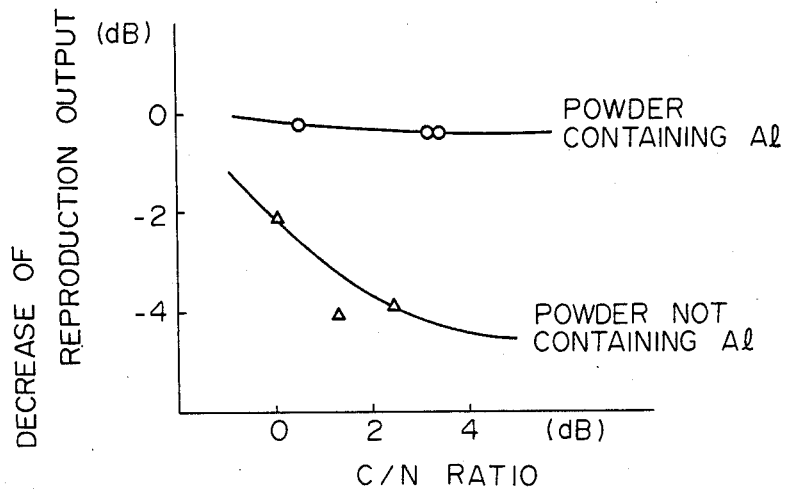
FIG. 1 is a graph showing examples of a relationship between a C/N ratio and decrease of reproduction output level after repeated running of 10 times with respect to 8 mm type video tapes.

A magnetic recording medium of the present invention basically comprises a nonmagnetic support and a magnetic recording layer provided on the surface, and the magnetic recording layer comprises a ferromagnetic metal powder and an abrasive, both dispersed in a binder.

A material of the nonmagnetic support can be selected from those conventionally employed for a nonmagnetic support of a known magnetic recording medium.

Examples of the material of the nonmagnetic support include polyethylene terephthalate, polypropylene, polycarbonate, polyethylene naphthalate, polyamide, polyamideimide, polyimide, and metallic foils such as aluminum foil and stainless steel foil. The thickness of the nonmagnetic support generally in the range of 3 to 50 $\mu$m, preferably in the range of 5 to 30 $\mu$m.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic metal powder and an abrasive, both dispersed in a binder.

The ferromagnetic metal powder employable in the invention is a powder of ferromagnetic metal such as iron, cobalt and nickel, or a powder mainly containing an alloy thereof, and contains an aluminum component (preferably in the form of oxide). The aluminum component is preferably contained in the vicinity of the surface of the ferromagnetic metal powder.

As the typical ferromagnetic metal powder containing an aluminum component, there can be mentioned a ferromagnetic alloy powder containing an aluminum component and further containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide.

The aluminum component is contained in the ferromagnetic metal powder in an amount of 1 to 6% by weight, preferably 1 to 5% by weight in terms of aluminum metal. When the amount of the aluminum component exceeds 6% by weight, the amount of the ferromagnetic metal component decreases, whereby the electromagnetic properties of the resulting ferromagnetic metal powder are not satisfactorily improved. When the amount thereof is less than 2% by weight, the running endurance of the magnetic recording layer of the recording medium is not satisfactorily improved. The electromagnetic properties of the ferromagnetic metal powder are not particularly lowered as far as the aluminum component is contained therein in an amount of the above-mentioned specific range.

The ferromagnetic metal powder employable in the invention preferably has a specific surface area (S-BET) of not less than 42 m$^2$/g, more preferably not less than 45 m$^2$/g, and a coercive force (Hc) of not less than 800 Oe, more preferably not less than 1,000 Oe. The ferromagnetic metal powder is generally used in a needle shape, grain shape, dice shape, rice shape or plate shape, and preferred is a ferromagnetic metal powder in a needle shape. In the magnetic recording medium of the present invention, even in the case of using the above-described ferromagnetic metal powder of a needle shape having very small sized particles and a high coercive force, the ferromagnetic metal powder can be well dispersed in the magnetic recording layer by using a resin component having a polar group (described hereinafter), and hence its excellent electromagnetic properties is not deteriorated.

The ferromagnetic metal powder containing the aluminum component can be prepared, for example, by the following process.

In the first place, a powder of $\alpha$-FeOOH, $\alpha$-Fe$_2$O$_3$, etc. is prepared in a conventional manner. Separately, a solution of a water-soluble aluminum salt such as aluminum sulfate is prepared, and in the solution is dispersed the powder prepared as above. Then pH of the solution is adjusted to set in the acid region, and then aluminum hydroxide is allowed to deposit on the surfaces of the particles of $\alpha$-FeOOH or $\alpha$-Fe$_2$O$_3$. In the second place, the particles having the deposited aluminum hydroxide on their surfaces are successively subjected to filtration and drying procedure. The obtained particles are then subjected to reduction under heating by using a reducing gas such as hydrogen or carbon monoxide to prepare a ferromagnetic metal powder. The content of the aluminum in the ferromagnetic metal powder can be readily adjusted by varying the concentration of the above-mentioned solution of a water-soluble aluminum salt.

The magnetic recording layer of the magnetic recording medium according to the invention contains an abrasive. The abrasive preferably contains α-alumina, chrome oxide, silicon carbide or silicon nitride as a host component. The abrasive generally has an average particle diameter of 0.1 to 1.0 μm, preferably 0.1 to 0.5 μm. The amount of the abrasive in the magnetic recording layer is generally in the range of 1 to 12 parts by weight, preferably 2 to 10 parts by weight, more preferably 3 to 6 parts by weight, based on 100 parts by weight of the ferromagnetic metal powder containing the above-mentioned aluminum in the vicinity of the surfaces of the ferromagnetic metal powder particles.

The magnetic recording layer according to the invention contains a binder generally in an amount of 10 to 40 parts by weight, preferably 15 to 30 parts by weight, based on 100 parts by weight of the ferromagnetic metal powder.

The binder comprises a resin component. Examples of the resin component for the binder employable in the invention include a vinyl chloride copolymer, a vinylidene chloride copolymer, a polyester resin, an acrylic resin, a polyvinyl acetal resin, a polyvinyl butyral resin, a phenoxy resin, an epoxy resin, a butadiene/acrylonitrile copolymer, a polyurethane resin and an urethane epoxy resin. They can be employed singly or in combination. Preferred is a combination of a polyurethane resin and a vinyl chloride copolymer.

In the magnetic recording layer according to the invention, at least one resin component employed for the binder preferably contains a repeating unit having a polar group.

Examples of the polar group incorporated into the repeating unit include —COOM, —SO$_3$M, —OSO$_3$M and —PO(OM')$_2$, in which M is hydrogen or an alkali metal atom, and M' is hydrogen, an alkali metal atom or a lower hydrocarbon group.

In the invention, it is preferred to use a combination of a polyurethane resin and a vinyl chloride copolymer as the binder, as described hereinbefore, and in this case (i.e., in the case of using such combination), at least one of the polyurethane resin and the vinyl chloride copolymer preferably contains a repeating unit having a polar group.

Examples of the repeating unit contained in the vinyl chloride copolymer include a repeating unit having one or more polar groups selected from the group consisting of —COOM, —SO$_3$M, —OSO$_3$M and —PO(OM')$_2$, wherein M and M' have the same meanings as defined above. The vinyl chloride copolymer may contain the repeating unit independently or in combination. Preferably employed is a vinyl chloride copolymer containing a repeating unit having —SO$_3$Na and/or a repeating unit having —COOH.

The above-mentioned repeating unit having the specific polar group is contained in the vinyl chloride copolymer in an amount of generally 0.001 to 5.0 mol.%, preferably 0.01 to 5.0 mol.%, most preferably 0.05 to 3.0 mol.%. When the amount of the repeating unit having the polar group is less than 0.001 mol.%, the ferromagnetic metal powder is liable to be poorly dispersed. When the amount of the repeating unit exceeds 5.0 mol.%, the vinyl chloride copolymer becomes hygroscopic, whereby the resulting magnetic recording tape decreased in the weathering resistance.

Preferably, the above-mentioned vinyl chloride copolymer further contains a repeatng unit having an epoxy group. The epoxy group contained in the vinyl chloride copolymer serves to stabilize the copolymer and prevent a dehydrochlorination reaction which is progressive with time in the copolymer.

When the vinyl chloride copolymer contains a repeating unit having an epoxy group, the amount of the repeating unit having an epoxy group is preferably in the range of 1 to 30 mol.%. Further, the repeating unit having an epoxy group is contained in the copolymer in an amount of preferably 0.01 to 0.5 mol., more preferably 0.01 to 0.3 mol, per one mol. of the vinyl chloride repeating unit composing the vinyl chloride copolymer.

The above-described vinyl chloride copolymer generally has a number-average molecular weight ranging from 10,000 to 200,000, preferably from 10,000 to 100,000, more preferably from 15,000 to 60,000.

The vinyl chloride copolymer having the above-stated specific polar group can be prepared by copolymerizing a vinyl chloride monomer with a monomer having a specific polar group and a reactive double bond according to a known process.

Examples of the monomer having a reactive double bond and a polar group employable for introducing a polar group into a vinyl chloride copolymer include 2-(meth)acrylamide-2-methylpropanesulfonic acid, vinyl sulfonic acid, sodium salt or potassium salt thereof, (meth)acrylic acid-ethyl 2-sulfonate, sodium salt or potassium salt thereof, maleic anhydride, (meth)acrylic acid, and (meth)acrylic acid-2-phosphoric acid ester.

In the case of introducing the epoxy group into the vinyl chloride copolymer, glycidyl (meth)acrylate is generally employed as a monomer having a reactive double bond and an epoxy group.

Other methods than the method as given above can be also utilized for incorporating a polar group into a vinyl chloride copolymer. For instance, a vinyl chloride copolymer having a hydroxyl group is initially prepared, and thus prepared copolymer is caused to react with a compound containing a polar group and a chlorine atom (e.g., monochloroacetic acid, or epichlorohydrin for incorporating an epoxy group) through dehydrochlorination reaction to incorporate the polar group into the copolymer.

In the preparation of a vinyl chloride copolymer employable in the invention, other monomers such as vinyl ethers, α-monoolefins, acrylic acid esters, unsaturated nitrile, aromatic vinyl and vinyl esters may be also contained so as to denature the resulting vinyl chloride copolymer.

Examples of the repeating unit having a polar group contained in the polyurethane resin include a repeating unit having one or more polar groups selected from the group consisting of —SO$_3$M, —OSO$_3$M, —COOM and —PO(OM')$_2$, in which M and M' have the same meanings as defined hereinbefore. The polyurethane resin may contain the repeating unit independently or in combination. Preferably employed is a polyurethane resin containing a repeating unit having —SO$_3$Na and/or a repeating unit having —COOH.

The repeating unit having the specific polar group is contained in the polyurethane resin in an amount of generally 0.001 to 5.0 mol.%, preferably 0.01 to 5.0 mol.%, more preferably 0.01 to 2.0 mol.%. If the amount of the repeating unit having the specific polar group is less than 0.001 mol.%, the ferromagnetic metal powder is liable to be poorly dispersed. If the amount thereof exceeds 5.0 mol.%, the polyurethane resin becomes hygroscopic whereby the resulting magnetic tape decreases in the weathering resistance.

The polyurethane resin having such repeating unit can be prepared, for instance, by the following process.

A polyurethane resin is generally produced by reaction of a polyisocyanate compound with a polyol component. As the polyol component, there is generally used polyester polyol which is produced by reaction of a polyol with a polybasic acid.

The above-described conventional process can be applied to the preparation of a polyurethane resin employable in the invention. In more detail, a polybasic acid having a polar group as a portion of the polybasic acid or polyol having a polar group is used to produce a polyester polyol, and thus obtained polyester polyol is caused to react with a polyisocyanate compound to produce a polyurethane resin.

Examples of the polybasic acid having a polar group or the polyol having a polar group include 5-sulfoisophthalic acid, 2-sulfoisophthalic acid, 4-sulfophthalic acid, 3-sulfophthalic acid, dialkyl 5-sulfoisophthalate, dialkyl 2-sulfoisophthalate, alkyl 4-sulfophthalate, alkyl 3-sulfophthalate, sodium salts thereof, potassium salts thereof, dimethylolpropionic acid, sodium salts thereof, and potassium salts thereof.

The above-mentioned reaction is already known, and the polyurethane resin employable in the invention can be prepared utilizing the known reaction.

As the polyol component not having a polar group or the polybasic acid not having a polar group employable in the preparation of polyester polyol, there can be chosen from those conventionally employed.

The polyester polyol having a specific polar group obtained as above generally has a number-average molecular weight ranging from 500 to 8,000.

As the polyisocyanate compound employable for the reaction with the above-mentioned polyester polyol, there can be selected from those conventionally employed.

The polyurethane resin employable in the invention has a number-average molecular weight ranging generally from 10,000 to 200,000, preferably from 15,000 to 60,000.

Methods for incorporating a polar group into the polyurethane resin employable in the invention are by no means restricted to the above-described one, and other methods can be also employed. For instance, a polyurethane resin incorporated with a polyfunctional base, —OH, is first produced, and the polyurethane resin is caused to react with a compound containing a polar group and a chlorine atom (e.g., monochloroacetic acid) through dehydrochlorination reaction so as to incorporate a polar group into the polyurethane resin.

In the case of using a combination of the vinyl chloride copolymer and polyurethane resin as a binder for the magnetic recording layer of the recording medium according to the invention, the ratio between the vinyl chloride copolymer and the polyurethane resin is generally in the range of from 35:65 to 80:20 (vinyl chloride copolymer:polyurethane resin, by weight), preferably in the range of from 40:60 to 70:30. When this combination is used as the binder, the ferromagnetic metal powder containing aluminum on its surface tends to be much highly dispersed in the magnetic recording layer as compared with a case of using other resin component.

Further, the binder employable in the invention is preferably a cured material obtained by adding a polyisocyanate compound to the above-mentioned vinyl chloride copolymer and polyurethane resin.

As the polyisocyanate compound used in combination with the vinyl chloride copolymer and the polyurethane resin, there can be mentioned those conventionally used. Examples of the polyisocyanate compound include a reaction product of 3 moles of diisocyanate (e.g., diphenylmethane-4,4'-diisocyanate, tolylene diisocyanate, or xylylene diisocyanate) and 1 mol of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, and a polymer of diphenylmethane diisocyanate. The amount of the polyisocyanate compound is generally the same amount or not larger than that of the polyurethane resin.

When the above-mentioned polyurethane resin, vinyl chloride copolymer and polyisocyanate compound are employed in combination, the polyisocyanate compound serves to form a three-dimensional crosslinking structure between the polyurethane resin and the vinyl chloride copolymer, whereby a binder of high strength can be prepared.

By using the ferromagnetic metal powder containing aluminum and the resin having a polar group as a resin component of a binder as described above, the affinity of the resin component to the ferromagnetic metal powder can be enhanced, and thereby the ferromagnetic metal powder can be well dispersed in the magnetic recording layer. As a result, the resulting recording medium can be highly improved in the electromagnetic conversion characteristics.

The magnetic recording layer of the recording medium according to the invention may further contain other additives such as a lubricant and an antistatic agent.

A process for the preparation of a magnetic recording medium according to the present invention will be described hereinafter.

In the first place, the above-mentioned ferromagnetic metal powder, α-alumina, and further other additives if desired, are dispersed in an organic solvent conventionally used such as methyl ethyl ketone and cyclohexanone to prepare a magnetic paint. The magnetic paint is coated over a nonmagnetic support to form a magnetic recording layer having thickness of generally 0.2 to 10 μm (in dry thickness). In the second place, the resulting sheet comprising a magnetic recording layer and a nonmagnetic support is then subjected to various treatments such as magnetic orientation, drying process, surface smoothening process and curing process. The sheet is then cut or slit into a desired shape to give a magnetic recording medium.

The magnetic recording layer is generally provided on the nonmagnetic support by directly coating the magnetic paint over the support. However, it is also possible to provide the recording layer on the support through an adhesive layer or a subbing layer.

Processes for preparing a magnetic paint or coating the magnetic paint, and various treatments such as magnetic orientation, drying process, surface smoothening process and curing process are already known, and those known processes or treatments can be also applied to the present invention.

The examples and the comparison examples of the present invention are given below. In those examples, the expression "part(s)" means "part(s) by weight", unless otherwise specified.

EXAMPLE 1

The components indicated below were kneaded in a ball mill for 48 hours to give a dispersion.

| | |
|---|---|
| Ferromagnetic metal alloy powder (*1) | 100 parts |
| Vinyl chloride copolymer (MFR-TS, available from Nisshin Chemical Co., Ltd.) | 12 parts |
| Polyurethane resin (Niporan N-2304, available from Nippon Polyurethane Co., Ltd.) | 8 parts |
| α-Alumina | 5 parts |
| Oleic acid | 1 part |
| Butyl stearate | 1 part |
| Methyl ethyl ketone | 125 parts |
| Toluene | 125 parts |

To the obtained dispersion was added 8 parts of a polyisocyanate compound (Desmodule L, available from Bayer AG), and the mixture was further kneaded for one hour. The resulting dispersion was filtered over a filter having a mean pore size of 1 μm to give a magnetic paint. The magnetic paint was coated over a polyethylene terephthalate support (thickness: 10 μm) by means of a reverse roll.

The nonmagnetic support with the coated layer was treated with an electromagnet at 3,000 gauss under wet condition to give a magnetic orientation. After the coated layer was dried, the layer was subjected to supercalendering. The resulting sheet was slit into a tape having a width of 8 mm. Thus, an 8 mm type video tape was prepared.

The ferromagnetic metal alloy powder (*1) listed above was prepared by the following process.

Ni-containing γ-iron oxyhydroxide having a ratio between Fe and Ni of 97:3, by weight, was prepared in a conventional manner.

Separately, in 6 l of an aluminum sulfate solution having a concentration of 1.95 mol/l was dispersed 100 g. of Ni-containing γ-iron oxyhydroxide prepared as above to give a dispersion. The dispersion was then treated with carbon dioxide by introducing the carbon dioxide therein at a stream rate of 5 l/min, and thus treated dispersion was successively subjected to filtration, washing with water and drying to give a powder.

Subsequently, 1 g. of the obtained powder was placed on a quartz board, and the powder on the quartz board was reduced by heating at a temperature of 400° C. in a hydrogen gas stream (stream rate: 1 l/min) by means of a tubular electric furnace, to prepare a ferromagnetic metal alloy powder.

As a result of elemental analysis, the obtained ferromagnetic metal alloy powder contained Fe and Ni in the amounts of 97 wt.% and 3 wt.%, respectively, and further contained aluminum in an amount of 3 wt.% as aluminum metal.

Further, the obtained ferromagnetic metal alloy powder had a coercive force (Hc) of 1,480 Oe and a specific surface area (S-BET) of 54 m²/g.

EXAMPLE 2

The procedure of Example 1 was repeated except for varying the amount of α-alumina to 10 parts by weight to prepare an 8 mm type video tape.

EXAMPLE 3

The procedure of Example 1 was repeated except for using chrome oxide in an amount of 5 parts by weight instead of α-alumina to prepare an 8 mm type video tape.

COMPARISON EXAMPLE 1

The procedure of Example 1 was repeated except for using a ferromagnetic metal alloy powder containing no aluminum (Fe: 97 wt.%, Ni: 3 wt.%, S-BET: 54 m²/g, Hc: 1,510 Oe) instead of the ferromagnetic metal powder (*1), to prepare an 8 mm type video tape.

COMPARISON EXAMPLE 2

The procedure of Comparison Example 1 was repeated except for varying the amount of α-alumina to 10 parts by weight to prepare an 8 mm type video tape.

COMPARISON EXAMPLE 3

The procedure of Comparison Example 1 was repeated except for using α-iron oxide in an amount of 10 parts by weight instead of α-alumina to prepare an 8 mm type video tape.

The video tapes obtained in Examples 1 to 3 and Comparison Examples 1 to 3 were evaluated on abrasion resistance (i.e., wearing properties) of the magnetic recording layer, decrease of output level and a C/N ratio according to the following tests. The results are set forth in Table 1.

Abrasion resistance of magnetic recording layer

A steel ball having diameter of ¼ inch was repeatedly rolled at 100 times on the surface of the magnetic recording layer within a distance of 20 mm along the longitudinal direction with providing a tension of 30 g. to the steel ball. Then, the volume of the abrased steel ball (i.e., abrasion wear) by contact with the magnetic recording layer was measured and the condition of the magnetic recording layer was observed. The results are classified into the following:

A: Abrasion wear of the steel ball is not less than $1.5 \times 10^{-5}$ mm³; and the magnetic recording layer is hardly damaged.

B: Abrasion wear of the steel ball is in the range of $1.5 \times 10^{-5}$ to $0.6 \times 10^{-5}$ mm³; and the magnetic recording layer is damaged but the damage does not reach the deep portion of the recording layer.

C: Abrasion wear of the steel ball is less than $0.6 \times 10^{-5}$ mm³; and
the magnetic recording layer is partially broken (i.e., seriously damaged) and the damage reaches the support.

Decrease of output level

The 8 mm type video tape was subjected to repeated running of 10 times in a commercially available 8 mm type video tape recorder (FUJIX-8, trademark of Fuji Photo Film Co., Ltd.), to measure reproduction output of the last running. The reproduction output is expressed by a relative value based on the reproduction output of the first running being 0 dB.

C/N ratio

A signal of 5 MHz was recorded on the 8 mm type video tape using the same tape recorder as used in the evaluation on the decrease of the reproduction output, and the recorded signal was reproduced to measure a noise occurring within the range of 5±1 MHz. Then the ratio of the reproduction signal to the noise was determined. This measurement was done by using an output level measuring machine (NV-870HD type, produced by Matsushita Electric Industrial Co., Ltd.). The C/N ratio is expressed by a relative value based on the C/N ratio of the video tape obtained in Comparison Example 2 being 0 dB.

TABLE 1

|  | Abrasion Resistance | Decrease of Output (dB) | C/N Ratio (dB) |
| --- | --- | --- | --- |
| Example 1 | A | −0.3 | +3.1 |
| Example 2 | A | −0.1 | +0.5 |
| Example 3 | A | −0.3 | +2.6 |
| Com. Example 1 | C | −4.0 | +2.3 |
| Com. Example 2 | B | −2.0 | 0 |
| Com. Example 3 | C | −4.2 | +1.3 |

FIG. 1 is a graph showing a relationship between the C/N ratio and the decrease of output after repeated running of 10 times with respect to the 8 mm type video tapes obtained in Examples 1 to 3 (each using the ferromagnetic metal alloy powder containing an aluminum component) and the 8 mm type video tapes obtained in Comparison Examples 1 to 3 (each using the ferromagnetic metal alloy powder not containing any aluminum component).

As is evident from the results set forth in Table 1 and shown in FIG. 1, the magnetic recording media according to the present invention show high running endurance and high electromagnetic conversion characteristics.

EXAMPLE 4

The procedure for preparing a ferromagnetic metal alloy powder in Example 1 was repeated except for varying the amount of an aluminum component to prepare a variety of ferromagnetic metal alloy powders. Using the obtained ferromagnetic metal alloy powders and the same other components as used in Example 1 (amount of α-alumina: 5 parts by weight), various 8 mm type video tapes were prepared in the same manner as described in Example 1.

The obtained video tapes were examined on the abrasion resistance of the magnetic recording layer according to the above-described test. The results are graphically shown in FIG. 2.

EXAMPLE 5

The procedure of Example 4 was repeated except for varying the amount of α-alumina to 10 parts by weight to prepare a variety of 8 mm type video tapes.

The obtained video tapes were examined on the abrasion resistance of the magnetic recording layer according to the above-described test. The results are graphically shown in FIG. 2.

Figure 2:
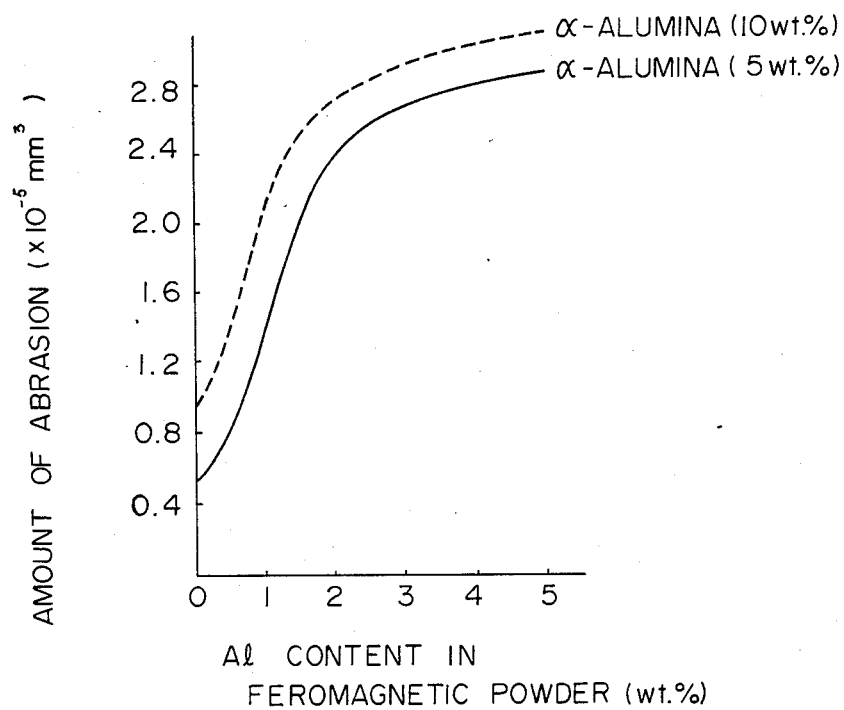
FIG. 2 is a graph showing an abrasion resistance of the magnetic recording layer with respect to 8 mm type video tapes obtaind by using a variety of ferromagnetic metal powders containing aluminum in different amounts and containing other components in the same amounts as each other.

As is evident from FIG. 2, in the case that the aluminum component was contained in the ferromagnetic metal alloy powder in an amount of not less than 1 wt.% (in terms of aluminum metal) and other components were the same as each other, the resulting magnetic recording layer was prominently enhanced in the abrasion resistance. However, even if the aluminum component was contained in the ferromagnetic metal alloy powder in an amount of more than approx. 6 wt.% (in terms of aluminum metal), the abrasion resistance of the magnetic recording layer was only enhanced to a certain level, that is, there was a limitation on the abrasion resistance of the magnetic recording layer.

EXAMPLE 6

The procedure of Example 1 was repeated except for further adding 12 parts by weight of a vinyl chloride copolymer and 8 parts by weight of a polyurethane resin to the components for a magnetic paint of Example 1, to prepare an 8 mm type video tape.

The above-mentioned vinyl chloride copolymer and polyurethane resin were prepared by the following processes.

Vinyl chloride copolymer

Into a 500-ml stainless autoclave equipped with a magnetic induction stirrer and a pressure indicator were introduced 300 ml of nitrogen-substituted distilled water dissolving 0.6 g. of polyvinyl alcohol, 0.15 g. of azobisisobutyronitrile, 16.6 g. of glycidyl methacrylate and 8.0 g. of sodium 2-acrylamido-2-methylpropanesulfonate, and the autoclave is covered with a lid. The autoclave was then allowed to cool in a dry ice-methanol bath to lower a temperature within the autoclave to −20° C.

Subsequently, the autoclave was charged with nitrogen gas to substitute a gas in the autoclave by the nitrogen gas, and then rapidly introduced 100 g. of a cooled liquid vinyl chloride. The components in the autoclave were stirred for approx. 15 min. at elevating temperature inside the autoclave to 60° C. to perform a polymerization reaction.

All of the reactive components in the autoclave were consumed to lower the pressure inside the autoclave so as to complete the polymerization reaction.

After lowering of the pressure, the autoclave was cooled to room temperature, and nitrogen was introduced into the autoclave to remove the remaining vinyl chloride. The obtained product was taken out of the autoclave. The product was then sufficiently washed with water and filtered to obtain a white powder of the polymerization product. The polymerization product was then dried under vacuum at 40° C. for 12 hours.

As a result of elemental analysis, thus obtained product was confirmed to be a vinyl chloride copolymer in which vinyl chloride, sodium 2-acrylamido-2-methylpropanesulfonate and glycidyl methacrylate were polymerized in a molar ratio of 87.5:2.5:10 (vinyl chloride:sodium 2-acrylamido-2-methylpropanesulfonate:glycidyl methacrylate). The obtained vinyl chloride copolymer had a number-average molecular weight of 30,000.

Polyurethane resin

Into a reactor equipped with a thermometer, a stirrer and a partial reflux condenser were introduced 582 g. of dimethyl terephthlate, 157 g. of dimethyl 5-sodium sulfoisophthalate, 434 g. of ethylene glycol, 728 g. of neopentyl glycol, 0.66 g. of zinc acetate and 0.08 g. of sodium acetate, to perform a reaction at 220° C. for 2 hours. To the reaction product in the reactor was further added 1,212 g. of sebacic acid to carry out a reaction for 2 hours. Then the pressure of the reaction system was reduced to 20 mmHg for 30 min., and the polymerization reaction was carried out at a pressure of 5–20 mmHg and a temperature of 250° C. for 50 min. to produce polyester polyol.

In the obtained polyester polyol, terephthalic acid, dimethyl 5-sodium sulfoisophthalic acid, sebacic acid, ethylene glycol and neopentyl glycol bonded to each other in a molar ratio of 15.3:2.9:30.7:22.5:28.6 (terephthalic acid:dimethyl 5-sodium sulfoisophthalic acid:sebacic acid:ethylene glycol:neopentyl glycol).

Into the same reactor as described above were introduced 1,000 g. of the polyester polyol obtained above, 1,280 g. of toluene, 850 g. of methyl isobutyl ketone, 71 g. of diphenylmethane diisocyanate and 1.2 g. of dibutyl tin dilaurate, to perform a reaction at a temperature of 70°–90° C. for 8 hours so as to produce a polyurethane resin. In the obtained polyurethane resin, dimethyl 5-sodiumsulfoisophthalate was polymerized in an amount of 0.25 mol%, and the polyurethane resin had a number-average molecular weight of 20,000.

EXAMPLE 7

The procedure for preparing a vinyl chloride copolymer in Example 6 was repeated except for not using glycidyl methacrylate to prepare a vinyl chloride copolymer. Using thus obtained vinyl chloride copolymer, an 8 mm type video tape was prepared in the same manner as described in Example 1.

EXAMPLE 8

The procedure of Example 6 was repeated except for using chrome oxide in an amount of 5 parts by weight instead of α-alumina to prepare an 8 mm type video tape.

COMPARISON EXAMPLE 4

The procedure of Example 6 was repeated except for using a ferromagnetic metal alloy powder containing no aluminum (Fe: 97 wt.%, Ni: 3 wt.%, S-BET: 54 m2/g, Hc: 1,510 Oe) instead of the ferromagnetic metal alloy powder (*1), to prepare an 8 mm type video tape.

The video tapes obtained in Examples 6 to 8 and Comparative Example 4 were evaluated on abrasion resistance (i.e., wearing properties) of the magnetic recording layer, decrease of output level and a C/N ratio according to the above-described tests. The results are set forth in Table 2.

TABLE 2

| | Abrasion Resistance | Decrease of Output (dB) | C/N Ratio (dB) |
| --- | --- | --- | --- |
| Example 6 | A | −0.1 | +3.7 |
| Example 7 | A | −0.2 | +2.5 |
| Example 8 | A | −0.4 | +2.3 |
| Com. Example 4 | C | −4.2 | +3.4 |

EXAMPLE 9

The procedure for preparing a ferromagnetic metal alloy powder in Example 6 was repeated except for varying the amount of an aluminum component to prepare a variety of ferromagnetic metal alloy powders. Using the obtained ferromagnetic metal alloy powders, various 8 mm type video tapes were prepared in the same manner as described in Example 6.

The obtained video tapes were examined on the abrasion resistance of the magnetic recording layer according to the above-described test. The results are graphically shown in FIG. 3.

Figure 3:
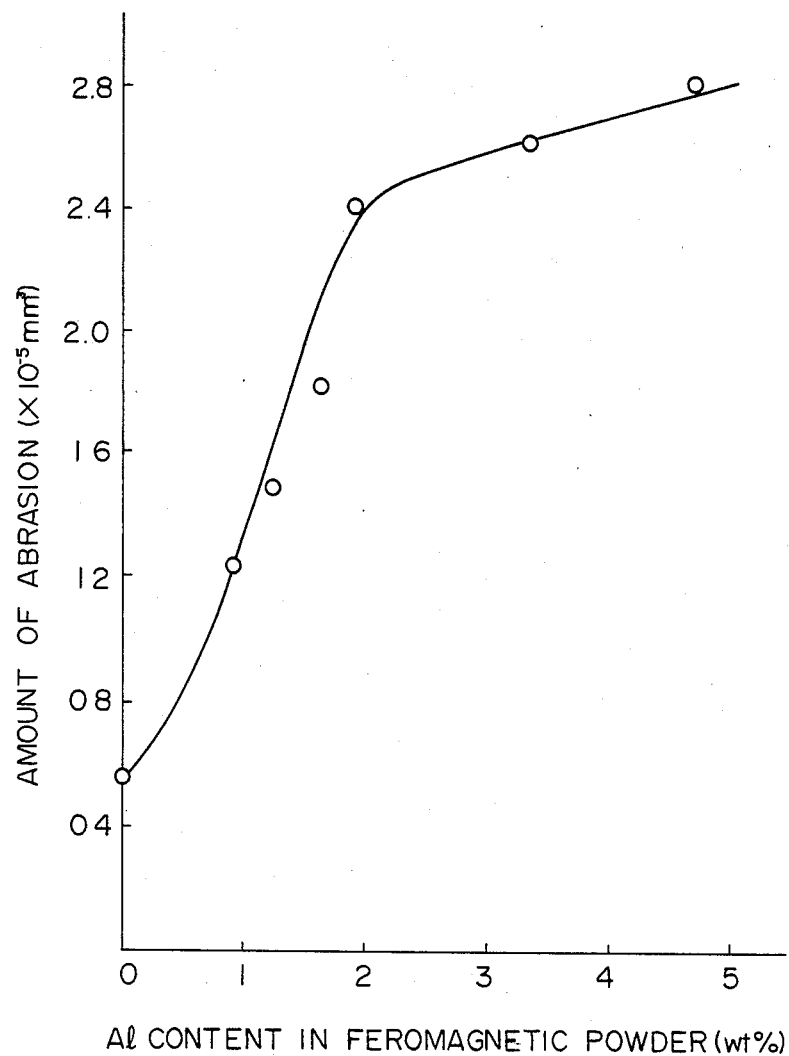
FIG. 3 is a graph showing an abrasion resistance of the magnetic recording layer with respect to 8 mm type video tapes obtained by using a variety of ferromagnetic metal powders containing aluminum in different amounts and containing other components in the same amounts as each other.

As is clear from FIG. 3, in the case that the aluminum component was contained in the ferromagnetic metal alloy powder in an amount of not less than 1 wt.% (in terms of aluminum metal) and other components were the same as each other, the resulting magnetic recording layer was prominently enhanced in the abrasion resistance. However, even if the aluminum component was contained in the ferromagnetic metal alloy powder in an amount of more than approx. 6 wt.% (as aluminum metal), the abrasion resistance of the magnetic recording layer was only enhanced to a certain level, that is, there was a limitation on the abrasion resistance of the magnetic recording layer.

We claim:

1. In a magnetic recording medium comprising a non-magnetic support and a magnetic recording layer provided on the support, said magnetic recording layer comprising a ferromagnetic metal powder having a specific surface area of at least 42 m$^2$/g and an abrasive both dispersed in a binder, the improvement wherein:

said ferromagnetic metal powder contains aluminum oxide in an amount of 1 to 6% by weight as aluminum metal on its surface;

said abrasive in the magnetic recording layer comprises a material selected from the group consisting of α-alumina, chrome oxide, silicon carbide and silicon nitride; and said binder contains a polar group selected from the group consisting of —SO$_3$M, —OSO$_3$M, and —PO(OM')$_3$, wherein M is hydrogen or an alkali metal atom, and M' is hydrogen, an alkali metal atom or a lower hydrocarbon group, said polar group being contained in the binder in an amount of 0.001 to 5.0 mol.%.

2. The magnetic recording medium as claimed in claim 1, wherein said ferromagnetic metal powder contains the aluminum oxide in an amount of 1 to 5% by weight as aluminum metal.

3. The magnetic recording medium as claimed in claim 1, wherein said polar group is contained in the binder in an amount of 0.01 to 5.0 mol.%.

4. The magnetic recording medium as claimed in claim 1, wherein said polar group is contained in the binder in an amount of 0.05 to 3.0 mol.%.

5. The magnetic recording medium as claimed in claim 1, wherein said abrasive has an average particle diameter of 0.01 to 1.0 μm, the amount of the abrasive in the magnetic recording layer is in the range of 1 to 12 parts by weight and the binder in the magnetic recording layer is present in an amount of 10 to 40 parts by weight based on 100 parts by weight of the ferromagnetic metal powder.

6. The magnetic recording medium as claimed in claim 1, wherein said binder comprises a polyurethane resin and a vinyl chloride copolymer and at least one of said polyurethane resin and vinyl chloride copolymer contains a repeating unit having the polar group.

* * * * *